United States Patent [19]

Layh

[11] Patent Number: 4,707,601
[45] Date of Patent: Nov. 17, 1987

[54] POSITION SIGNALLER WHICH COMPENSATES FOR BACKLASH IN ITS GEAR TRANSMISSION

[76] Inventor: Hans-Dieter Layh, Zachersweg 17, D-7121 Gemmrigheim, Fed. Rep. of Germany

[21] Appl. No.: 13,414

[22] Filed: Feb. 11, 1987

Related U.S. Application Data

[63] Continuation of Ser. No. 697,347, Feb. 1, 1985, abandoned.

[30] Foreign Application Priority Data

Feb. 22, 1984 [DE] Fed. Rep. of Germany ....... 3406336

[51] Int. Cl.⁴ .............................................. G01D 5/34
[52] U.S. Cl. ................................. 250/231 SE; 74/409
[58] Field of Search ............ 250/231 SE, 237 G, 561; 318/652; 356/375; 340/347 P, 680, 686; 116/282, 284–286, 230; 74/409

[56] References Cited

U.S. PATENT DOCUMENTS 4,123,653 10/1978 Bovio ............................. 250/231 SE
4,363,026 12/1982 Salmon .......................... 340/347 P Primary Examiner—Edward P. Westin
Attorney, Agent, or Firm—Michael J. Striker

[57] ABSTRACT

A signaller part (13) is coupled drivewise with a transmitting element (2), on the one hand by a force transmitting connection and on the other hand in a form-locked and slip-free manner via a transmission (5, 6, 8, 9, 10) which exhibits backlash. The transmission element (2) is compulsorily coupled with a machine part (4) the position of which is to be adjusted. As a result of its transmission ratio the transmission (5, 6, 8, 9, 10) only permits a reduced speed of the signaller part (13) relative to the transmitting element (2). When, after reaching the selected position, the machine part (4) attempts to move away from this position in a direction of movement which opposes the preceding adjustment movement, then the signaller part (13) is initially moved by and with the transmitting element at unreduced speed as a result of the backlash of the transmission, i.e. the departure from the selected position is indicated with increased accuracy.

22 Claims, 1 Drawing Figure

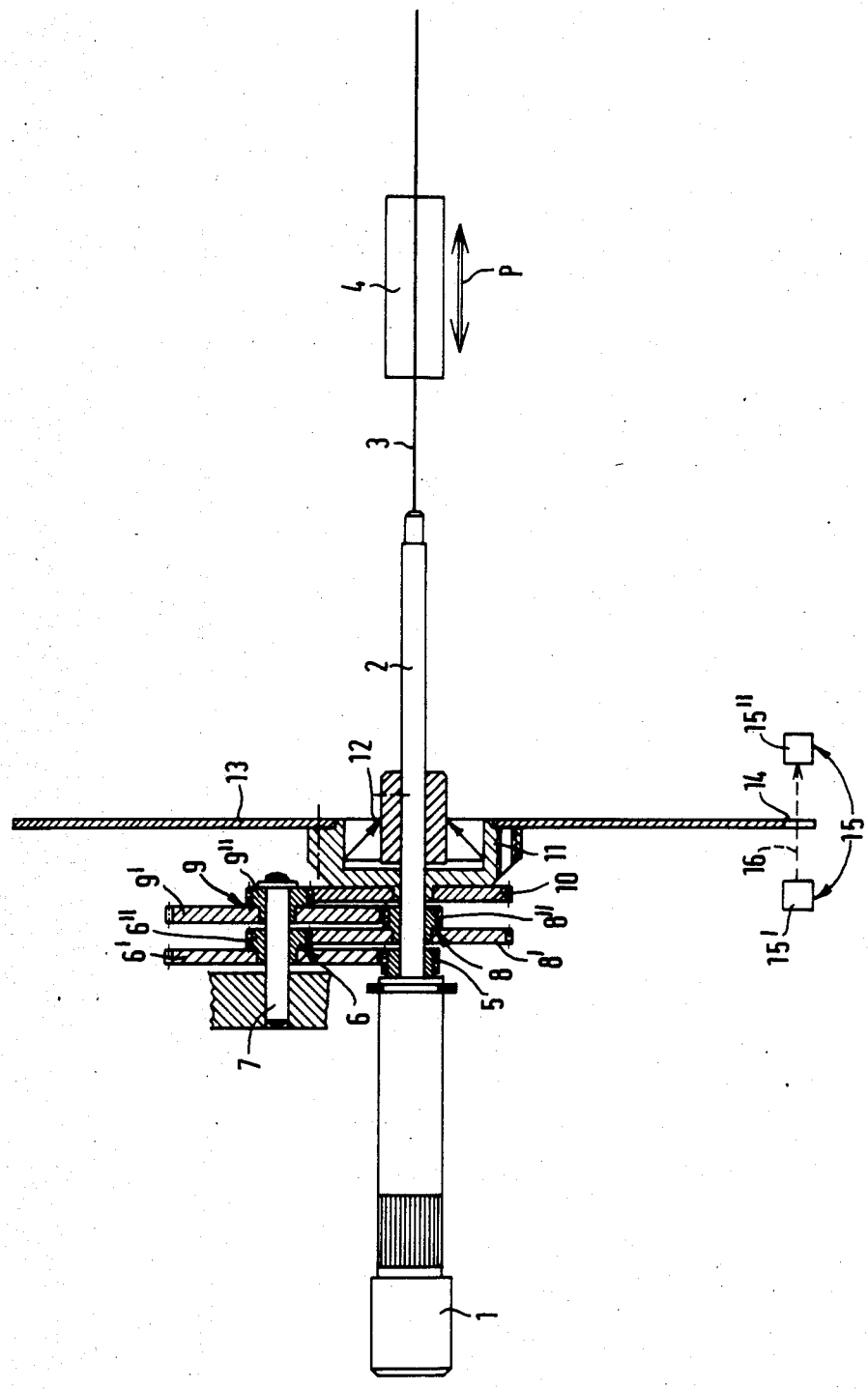

POSITION SIGNALLER WHICH COMPENSATES FOR BACKLASH IN ITS GEAR TRANSMISSION

This is a continuation of application Ser. No. 697,347, filed Feb. 1, 1985, now abandoned.

BACKGROUND OF THE INVENTION

The invention relates to a position signaller, in particular an end position signaller for parts of machines, in particular of machine tools or the like, the position of which can be adjusted, in particular by a motor, wherein the position signaller has a signaller part which is movable by the positioning motor or positioning drive, or by the adjustable machine part, analogously to the movements of this adjustable machine part.

In machine tools the end positions of workpiece carriers or tool carriers have to be very accurately adjusted and maintained. In order to monitor the position which has been selected in any particular case it is known to permit path-dependent switches or end position switches to cooperate directly with the workpiece carrier or tool carrier. The named switches are however extremely expensive because both the manufacture of the switches and also their assembly are associated with comparatively high costs.

Moreover, it is known to couple the machine part which is to be adjusted, or its positioning drive or positioning motor, with a position signaller in such a way that a movable signaller part executes a movement analogous to the adjustable machine part. By way of example a pointer element which cooperates with markings of an associated scale can serve as the appropriate signaller part. Such arrangements are however likewise relatively costly because the transmission mechanism between the positioning drive, or the positioning motor, or the machine part to be adjusted and the signaller part must be very precise.

SUMMARY OF THE INVENTION

The object underlying the invention is to provide a position signaller which combines precision with low cost.

This object is satisfied in that the signaller part is coupled, on the one hand, drive-wise by a force transmitting connection with a transmitting element which is compulsorily coupled with the positioning motor or positioning drive, or with the adjustable machine part, and, on the other hand, in slip-free or form-locked manner with a step-down gear mechanism which exhibits backlash and which is in turn coupled in a slip-free or form-locked manner with the transmitting element and which permits the signaller part to have only a reduced speed relative to the transmitting element.

If, for example, the machine part which is to be adjusted is displaced in an arrangement of this kind in one direction, in order to reach an end position or the like, then the transmitting element tries to drive the signaller part which is coupled thereto in force transmitting connection at a higher speed than is permitted by the step down gear mechanism. Accordingly the signaller part is held back by the step down gear mechanism relative to the movement of the transmitting element, i.e. the transmitting element leads the signaller part while overcoming a resistance which is predetermined by the strength of the force transmitting connection. This is equivalent to saying that the elements of the step down gear mechanism are permanently biased into contact with one another and accordingly operate without play. If the machine part which is to be adjusted tries to move (after reaching its predetermined end position or position) in a direction which is contrary to the direction of movement during the preceding adjustment then the transmitting element can move the signaller part with it at unreduced speed over a restricted distance which is predetermined by the play or backlash of the step down gear transmission. This signifies that the signaller part indicates a change in position of the machine part which takes place after adjusting the same by an amplified movement and thus with the highest accuracy.

The particular advantage of the invention is to be seen in the fact that it is precisely those inexpensive step down gear transmissions with a comparatively large degree of backlash which are advantageous with regard to the function of the position signaller of the invention, because here changes of the selected position of the machine part can be particularly clearly indicated.

In accordance with a preferred embodiment of the invention the signaller part is arranged in force-locked manner on a shaft driven by the positioning motor or positioning drive (this shaft can for example serve in known manner to drive a spindle which moves the machine part which is to be adjusted, with the machine part which is to be adjusted cooperating with the spindle in fundamentally known manner without backlash), is also rotatable relative to the shaft against resistance and is compulsorily coupled by means of a toothed coupling, or a gear wheel which is rotatably fixedly coupled with the signaller part, with a gear wheel which is rotatably fixedly mounted on the shaft via a gear transmission which is laid out as a speed transforming transmission which exhibits backlash.

A corresponding arrangement can be realised at a lowest cost.

In one preferred embodiment the signaller part meshes by means of its teeth or its gear wheel with a gear wheel of smaller diameter which is rotatably fixedly connected with a larger gear wheel; and the larger gear wheel meshes with the smaller gear wheel which is rotatably fixedly arranged on the shaft.

The position signaller preferably engages indirectly, by means of its teeth or its gear wheel which is rotatably fixedly connected therewith, with the small gear wheel which is rotationally fixedly arranged on the shaft of the positioning motor, via a plurality of gear wheel pairs which are rotationally journalled on an axle and also on the shaft driven by the positioning motor and which each consist of a small gear wheel and a larger gear wheel which is rotationally fixedly connected therewith.

The signaller part is conveniently connected in force-locked manner with the shaft driven by the positioning motor by means of a lip seal (Simmer ring).

In a particularly preferred embodiment a code disc is provided as the signaller part and cooperates with a light barrier arrangement, the light beam of which passes through a cut-out arranged in the code disc at a position of the code disc which is associated with the selected position or end position of the machine part.

The signaller part may also carry or form the tap of a potentiometer.

Thus, expressed somewhat differently, the present invention may be described as a position signalling apparatus for use with a movable machine element to signal when said machine element has reached a predetermined position, the apparatus comprising drive means for adjusting the position of said machine element; a transmission mechanism which exhibits backlash and which has an input and an output; a signaller part; and a friction coupling adapted to slip at a specific load; wherein said input of said transmission mechanism is fixedly connected to said drive means, wherein said output of said transmission mechanism is connected to said signaller element to drive the same without slip and wherein said signaller element is connected to one of said drive means and said machine element via said friction coupling.

A particularly preferred embodiment of the invention will now be explained in the following with reference to the drawing.

BRIEF DESCRIPTION OF THE DRAWING

The single FIGURE of the drawing shows, in partly schematic form, a positioning drive which serves to displace a machine part and which cooperates with a position signaller in accordance with the invention

DETAILED DESCRIPTION OF THE PREFFERED EMBODIMENTS

A positioning motor 1 drives a spindle 3 by means of a shaft 2 with which the spindle is connected in form-locked and a backlash-free manner. The spindle 3 cooperates in backlash-free manner with an adjustable machine part 4, for example a carriage or the like, and displaces it, depending on its direction of rotation, in one direction or the other in accordance with the double arrow P.

The gear or pinion 5 drives a pair of gears 6 which rotationally journalled on an axle 7 and consists of two gear wheels 6' and 6" which are rotationally fixedly connected to one another. The larger gear wheel 6' engages with the pinion 5 while the smaller gear wheel 6" meshes with a larger gear wheel 8' of a similar pair of gears 8 which is rotationally journalled on the shaft 2 (and which can accordingly be rotated as desired relative to the shaft 2). A smaller gear wheel 8" of the pair of gears 8 which is rotationally fixedly connected with the gear wheel 8' engages in turn with a larger gear wheel 9' of a further pair of gears 9 which is rotationally journalled on the axle 7. The smaller gear wheel 9" of the pair of gears 9 which is rotationally fixedly connected with the gear wheel 9' meshes with a gear wheel 10 which forms part of a wheel 11 which is rotationally fixedly connected to the gear wheel 10 and is rotationally journalled on the shaft 2. The wheel 11 is coupled in force-locked manner with the shaft 2 by means of a lip seal (Simmer ring) 12, i.e. the shaft 2 tries to move the wheel 11 in the prevailing direction of rotation by means of the lip seal 12 which acts as a clutch.

A code disc 13 having slots, cut-outs or the like 14 is arranged on the wheel 11. The slots 14 cooperate with a light barrier arrangement 15 and free the path of a light beam 16 from an emitter 15' to a receiver 15" when the code disc 13 is in an appropriate position.

The illustrated arrangement operates as follows:

The cut-out or cut-outs 14 in the code disc 13 correspond to positions of the machine part 4 which are to be selected. In order to reach such a position the machine part 4 may for example be displaced to the right as shown in the drawing. The spindle 3 is then driven by means of the shaft 2 with an appropriate direction of rotation in order to reach the desired position. Simultaneously the shaft 2 tries to turn the wheel 11 and the code disc 13 arranged thereon, because the wheel 11 and the shaft 2 are coupled in force transmitting connection via the lip seal 12. However, the reduction gearing or step down gear mechanism which is formed by the pinion 5, by the gear wheel pairs 6, 8 and 9 and also by the gear wheel 10 prevents the wheel 11 being driven with the same speed of rotation as the shaft 2. On the contrary the ratio of the speed of rotation of the shaft 2 and of the wheel 11 is predetermined by the transmission ratio of the named reduction gearing.

As a result of the force-locked coupling between the shaft 2 and the wheel 11 all gear wheels of the reduction transmission are biased against one another so that no play can occur so long as the shaft 2 retains its direction of rotation in the sense of displacing the machine part 4 towards the right.

As soon as the code disc 13 has freed the light beam 16 of the light barrier arrangement 15 by means of a corresponding cut-out 14 the machine part has reached the associated position. Accordingly the positioning motor 1 is stopped in known manner.

If the machine part 4—in the example of a machine tool a carriage carrying the workpiece—attempts to move to the left, for example because in the case of a machine tool correspondingly large forces are exerted on the workpiece by means of the tools, then the spindle 3, which cooperates without play with the machine part 4, and thus also the shaft 2 which is connected without play with the spindle 3, are displaced in the corresponding direction of rotation which is opposed to the direction of rotation which was previously present during the adjustment of the machine part 4. Because the reduction gearing exhibits backlash the shaft 2 can now, with the present direction of rotation, displace the wheel 11 and thus the code disc 13 through a certain angle at a speed which is non-reduced relative to the shaft 2 until the reduction gearing can again slow down the movement of the wheel 11 and of the code disc 13.

Thus, when the machine part 4 attempts to move away from the adjusted position the code disc 13 undergoes a very pronounced change of position, i.e. an indication is given with the highest accuracy when the machine part 4 tries to leave the selected position.

The invention is not restricted to an arrangement with rotating parts. A corresponding arrangement is also possible in the same sense if one part of the elements of the transmission gearing, or all of its elements, and/or the elements which serve to displace the machine part 4 and also the signaller part which is adjusted in analogous manner execute translatory movements. In other respects a lever transmission or the like can also be provided in place of a gear transmission.

Moreover, the signaller part 11, 13 can also serve to adjust a non-illustrated potentiometer so that a voltage can be tapped off which is analogous (proportional) to the position of the signaller part 11, 13.

I claim:

1. A position signaller for an adjustable machine part whose position is movable by positioning drive means so as to have an initial direction of movement, the position signaller comprising:

a signaller part;

a transmitting element drivably coupled with one of said drive means and the adjustable machine part so as to be driven at a speed;

a force transmitting connection drivably coupling said signaller part with said transmitting element; and a step-down gear mechanism connecting said signaller part to said transmitting element so as to slow down said signaller part to a reduced speed relative to said transmitting element during which said step-down gear mechanism does not exhibit play, said force transmitting connection being formed to slip while said step-down transmission mechanism drives said signaller part at said reduced speed, said step-down gear mechanism being arranged to exhibit play as soon as said initial direction of movement of said adjustable machine part changes and during which said signaller part is drivable via said force transmitting connection at a non-reduced speed relative to said speed of transmitting element.

2. A position signaller as defined in claim 1, wherein said signaller part is movable by the positioning drive means.

3. A position signaller as defined in claim 1, wherein said signaller part is movable by the adjustable machine part.

4. A position signaller as defined in claim 1, wherein said signaller part is connected in a slip-free manner to said step-down gear mechanism.

5. A position signaller as defined in claim 1, wherein said signaller part is connected in a form-locked manner to said step-down gear mechanism.

6. A position signaller as defined in claim 1, wherein said step-down gear mechanism is coupled with said transmitting element in a slip-free manner.

7. A position signaller as defined in claim 1, wherein said step-down gear mechanism is coupled with said transmitting element in a form-locking manner.

8. A position signaller as defined in claim 1, wherein said step-down gear mechanism is a speed transforming transmission which exhibits backlash and includes a first gear wheel, said transmitting element being a shaft driven by the positioning drive means, said first gear wheel being rotatably fixedly mounted on said shaft via said step-down gear transmission, said signaller part being arranged on said shaft in a force-locked manner so as to be rotatable relative to said shaft against resistance, and compulsarily coupled with said first gear wheel.

9. A position signaller as defined in claim 8, wherein said step-down gear mechanism further includes a second gear wheel rotatably fixedly coupled with said signaller part, said second gear wheel complsarily coupling said first gear wheel with said signaller part.

10. A position signaller as defined in claim 8; and further comprising a toothed coupling provided so as to compulsarily couple said first gear wheel with said signaller part.

11. A position signaller as defined in claim 10, wherein said step-down gear mechanism further includes a smaller gear wheel being rotatably fixedly connected with a larger gear wheel, said signaller part meshing with said smaller gear wheel and said larger gear wheel meshing with said first gear wheel.

12. A position signaller as defined in claim 11, wherein said step-down gear mechanism further includes a second gear wheel rotatably fixedly coupled with said signaller part, said signaller part meshing with said smaller gear wheel via said second gear wheel.

13. A position signaller as defined in claim 11, wherein said signaller part is provided with teeth which mesh with said smaller gear wheel.

14. A position signaller as defined in claim 8, wherein said step-down gear mechanism further includes an axle and a plurality of gear wheel pairs rotationally journalled on said axle and also on said shaft driven by the positioning drive means, said gear wheel pairs each including a small gear wheel and a larger gear wheel rotationally fixedly connected thereto, said signaller part being indirectly engagable with said first gear wheel via said plurality of gear wheel pairs.

15. A position signaller as defined in claim 14, wherein said signaller part is provided with teeth which are engagable indirectly with said first gear wheel via said gear wheel pairs.

16. A position signaller as defined in claim 14, wherein said step-down gear mechanism further includes a second gear wheel rotatably fixedly coupled with said signaller part, said signaller part being indirectly engagable with said first gear wheel by means of said second gear wheel via said plurality of gear wheel pairs.

17. A position signaller as defined in claim 1; and further comprising a lip seal, said lip seal being provided so as to connect said signaller part to said transmitting element in a force-locked manner.

18. A position signaller as defined in claim 11, wherein the ajustable machine part has a plurality of positions including a selected position and an end position, said signaller part being a code disc having a cut-out arranged thereon which is associated with one of positions of the machine part; and further comprising a light barrier arrangement including a light beam arranged so as to pass through said cut-out in said code disc.

19. A position signaller as defined in claim 11; and further comprising a tap of a potentiometer, said tap being carryable by said signaller part.

20. A position signaller as defined in claim 11, wherein said signaller part is formed as a tap of a potentiometer.

21. Position signalling apparatus for use with a movable machine element to signal when the machine element has reached a predetermined position, the apparatus comprising:
   drive means for moving the position of a machine element;
   a transmission mechanism which exhibits play and which has an input and an output;
   a signaller part; and
   a friction coupling being drivable in association with said drive means and being formed to slip at a specific load, said input of said transmission mechanism being drivably and fixedly connected to said drive means, said output of said transmission mechanism being drivably connected to said signaller part to drive said signaller part without slip, said signaller part being drivably connected to said friction coupling so that said signaller part is drivable via said friction coupling at a non-reduced speed when said transmission mechanism exhibits play, said transmission mechanism being formed and arranged to slow down said signaller part to a reduced speed relative to said non-reduced speed when said transmission mechanism does not exhibit said play, said friction coupling slipping when said signaller part is being driven at said reduced speed by said transmission mechanism.

22. Position signalling apparatus as defined in claim 21, wherein said transmission mechanism is a speed reducing transmission.

* * * * *